US011590686B2

(12) United States Patent
Bianconi et al.

(10) Patent No.: US 11,590,686 B2
(45) Date of Patent: Feb. 28, 2023

(54) SYSTEM AND METHODS FOR THERMOFORMING ARTICLES

(71) Applicant: NIKE, Inc., Beaverton, OR (US)

(72) Inventors: Mirko Bianconi, Verona (IT); Federico Zecchetto, Verona (IT)

(73) Assignee: NIKE, Inc., Beaverton, OR (US)

( * ) Notice: Subject to any disclaimer, the term of this patent is extended or adjusted under 35 U.S.C. 154(b) by 519 days.

(21) Appl. No.: 16/393,748

(22) Filed: Apr. 24, 2019

(65) Prior Publication Data

US 2019/0329482 A1 Oct. 31, 2019

Related U.S. Application Data

(60) Provisional application No. 62/662,628, filed on Apr. 25, 2018.

(51) Int. Cl.
*B29C 51/42* (2006.01)
*B29C 51/10* (2006.01)
(Continued)

(52) U.S. Cl.
CPC ............ *B29C 51/421* (2013.01); *B29C 51/10* (2013.01); *B29D 35/126* (2013.01); *B29K 2701/12* (2013.01); *B29L 2031/505* (2013.01)

(58) Field of Classification Search
CPC ..... B29C 51/421; B29C 51/10; B29C 51/004; B29C 51/42; B29C 51/303; B29C 51/263;
(Continued)

(56) References Cited

U.S. PATENT DOCUMENTS

| 3,782,705 A | 1/1974 | Western et al. |
| 3,784,995 A | 1/1974 | Egtvedt |

(Continued)

FOREIGN PATENT DOCUMENTS

| CN | 2415644 Y | 1/2001 |
| CN | 1084173 C | 5/2002 |

(Continued)

OTHER PUBLICATIONS

Final Office Action received for U.S. Appl. No. 16/393,741, dated Aug. 31, 2021, 12 pages.

(Continued)

*Primary Examiner* — Francisco W Tschen
*Assistant Examiner* — Elisa H Vera
(74) *Attorney, Agent, or Firm* — Shook, Hardy & Bacon LLP

(57) ABSTRACT

Systems and processes for thermoforming an article and for preparing an article for thermoforming are disclosed. The system for thermoforming can include one or more heating stations and a cooling station. The system for thermoforming can further include an article movement mechanism that can couple to an article and rotate the article inside a heating chamber, inside a cooling chamber, or both. The system for preparing an article for thermoforming can include a vessel that comprises a port, and a negative pressure generation system coupled to the port. The system for preparing an article for thermoforming can further include a compression material that forms an interior portion for receiving an article. The negative pressure generation system can cause the compression material to expand to allow for insertion of the article into the interior portion of the compression material.

20 Claims, 10 Drawing Sheets

(51) Int. Cl.
*B29D 35/12* (2010.01)
*B29K 701/12* (2006.01)
*B29L 31/50* (2006.01)

(58) Field of Classification Search
CPC ... B29C 51/261; B29C 51/424; B29C 71/009; B29C 2791/006; A43D 2200/20; A43D 2200/50; A43B 23/024; A43B 23/0255; A43B 23/0235; A43B 23/02; B29K 2701/12; B29L 2031/505; B29D 35/126; B29D 35/146; B29D 35/128; B29D 35/122
See application file for complete search history.

(56) References Cited

U.S. PATENT DOCUMENTS

| | | | |
|---|---|---|---|
| 3,848,287 A | 11/1974 | Simonsen | |
| 4,523,005 A | 6/1985 | Szycher | |
| 4,939,805 A | 7/1990 | Walega | |
| 4,964,229 A | 10/1990 | Laberge | |
| 4,974,393 A | 12/1990 | Rich et al. | |
| 5,866,058 A | 2/1999 | Batchelder et al. | |
| 5,969,076 A | 10/1999 | Lai et al. | |
| 6,161,354 A * | 12/2000 | Gilbert | B29C 51/24 52/520 |
| 6,299,817 B1 * | 10/2001 | Parkinson | A43B 3/02 264/246 |
| 6,497,786 B1 | 12/2002 | Kilgore et al. | |
| 6,705,853 B1 | 3/2004 | Nehring | |
| 9,456,661 B2 | 10/2016 | Dieter et al. | |
| 2002/0079617 A1 | 6/2002 | Kageyama | |
| 2004/0119198 A1 | 6/2004 | Alper et al. | |
| 2004/0164457 A1 * | 8/2004 | Rogers | B29C 41/386 264/310 |
| 2008/0211128 A1 * | 9/2008 | Lucier | B29C 51/12 264/101 |
| 2009/0273109 A1 | 11/2009 | Johnson et al. | |
| 2011/0108667 A1 * | 5/2011 | Keller | B64C 1/1484 244/119 |
| 2014/0044378 A1 | 2/2014 | Loeschen et al. | |
| 2014/0159267 A1 * | 6/2014 | Murch | B29C 35/007 264/40.6 |
| 2014/0237738 A1 | 8/2014 | Johnson et al. | |
| 2014/0239556 A1 | 8/2014 | Fisher et al. | |
| 2015/0282564 A1 | 10/2015 | Meschter et al. | |
| 2016/0031164 A1 * | 2/2016 | Downs | B29C 66/72141 428/12 |
| 2016/0113356 A1 | 4/2016 | Glough et al. | |
| 2016/0185062 A1 | 6/2016 | Boucher et al. | |
| 2016/0282564 A1 | 9/2016 | Little et al. | |
| 2017/0129200 A1 | 5/2017 | Adami et al. | |
| 2017/0368735 A1 | 12/2017 | Iovu | |
| 2018/0065353 A1 | 3/2018 | Wang | |
| 2018/0103726 A1 | 4/2018 | Cross | |
| 2019/0047236 A1 * | 2/2019 | Ruiz | B32B 1/00 |
| 2019/0329483 A1 | 10/2019 | Bianconi et al. | |
| 2019/0351604 A1 | 11/2019 | Chien et al. | |

FOREIGN PATENT DOCUMENTS

| | | |
|---|---|---|
| CN | 1518916 A | 8/2004 |
| CN | 1735499 A | 2/2006 |
| CN | 101500445 A | 8/2009 |
| CN | 102120352 A | 7/2011 |
| CN | 202965033 U | 6/2013 |
| CN | 103538181 A | 1/2014 |
| CN | 204015322 U | 12/2014 |
| CN | 104354312 A | 2/2015 |
| CN | 104738900 A | 7/2015 |
| CN | 204499657 U | 7/2015 |
| CN | 104875363 A | 9/2015 |
| CN | 104886876 A | 9/2015 |
| CN | 104886880 A | 9/2015 |
| CN | 105495855 A | 4/2016 |
| CN | 205167352 U | 4/2016 |
| CN | 106182712 A | 12/2016 |
| CN | 106617506 A | 5/2017 |
| CN | 106808675 A | 6/2017 |
| CN | 107438378 A | 12/2017 |
| CN | 207028262 U | 2/2018 |
| DE | 2124957 A1 | 11/1972 |
| EP | 0307561 A1 | 3/1989 |
| EP | 1587666 B1 | 7/2007 |
| EP | 2462908 A1 | 6/2012 |
| EP | 3245889 A1 | 11/2017 |
| GB | 1375159 | 11/1974 |
| JP | 8-38213 A | 2/1996 |
| JP | 11-147251 A | 6/1999 |
| JP | 2002-119307 A | 4/2002 |
| KR | 880012970 A | 11/1988 |
| KR | 0132259 B1 | 4/1998 |
| KR | 2003-0041618 A | 5/2003 |
| KR | 20040052647 A | 6/2004 |
| KR | 10-2006-0058991 A | 6/2006 |
| KR | 20060078278 A | 7/2006 |
| KR | 10-0966631 B1 | 6/2010 |
| KR | 10-2015-0110746 A | 10/2015 |
| KR | 20160147968 A | 12/2016 |
| TW | 201116225 A | 5/2011 |
| TW | 201208597 A | 3/2012 |
| TW | M486297 U | 9/2014 |
| WO | 2004056228 A1 | 7/2004 |
| WO | 2008122874 A1 | 10/2008 |

OTHER PUBLICATIONS

Final Office Action received for U.S. Appl. No. 15/347,650, dated Apr. 15, 2020, 9 pages.
Notice of Allowance received for U.S. Appl. No. 15/347,650, dated Apr. 13, 2021, 5 pages.
Notice of Allowance received for U.S. Appl. No. 15/347,650, dated Mar. 17, 2021, 7 pages.
Communication under Rule 71(3) dated Dec. 12, 2019 in European Patent Application No. 16801345.6, 121 pages.
Non-Final Office Action received for U.S. Appl. No. 15/347,650, dated Sep. 3, 2020, 10 pages.
International Search Report and Written Opinion dated Mar. 10, 2017 in International Patent Application No. PCT/US2016/061373, 14 pages.
International Preliminary Report on Patentability dated Feb. 22, 2018 in International Patent Application No. PCT/US2016/061373, 8 pages.
International Preliminary Report on Patentability received for PCT Patent Application No. PCT/US2019/032958, dated Dec. 3, 2020, 13 pages.
International Search Report and Written Opinion dated Sep. 19, 2019 in International Patent Application No. PCT/US2019/028965, 14 pages.
International Search Report and Written Opinion dated Oct. 23, 2019 in International Patent Application No. PCT/US2019/032958, 23 pages.
Non-Final Office Action dated Oct. 7, 2019 in U.S. Appl. No. 15/397,650, 10 pages.
International Search Report and Written Opinion dated Oct. 7, 2019 in International Patent Application No. PCT/US2019/028968, 14 pages.
Extended European Search Report received for European Patent Application No. 20176440.4, dated Oct. 8, 2020, 8 pages.
International Preliminary Report on Patentability received for PCT Patent Application No. PCT/US2019/028965, dated Nov. 5, 2020, 8 pages.
International Preliminary Report on Patentability received for PCT Patent Application No. PCT/US2019/028968, dated Nov. 5, 2020, 7 pages.
Non-Final Office action received for U.S. Appl. No. 16/393,741, dated Apr. 29, 2021, 14 pages.
Notice of Allowance received for U.S. Appl. No. 15/347,650, dated Jun. 7, 2021, 2 pages.

(56) References Cited

OTHER PUBLICATIONS

Final Office Action received for U.S. Appl. No. 16/415,873, dated May 16, 2022, 10 pages.
Intention to Grant received for European Patent Application No. 20176440.4, dated Jul. 19, 2022, 9 pages.
Non-Final Office Action received for U.S. Appl. No. 16/415,873, dated Nov. 9, 2021, 10 pages.
Notice of Allowance received for U.S. Appl. No. 16/393,741, dated Dec. 29, 2021, 9 pages.
Intention to Grant received for European Patent Application No. 20176440.4, dated Feb. 16, 2022, 9 pages.
Notice of Allowance received for U.S. Appl. No. 15/347,650, dated Mar. 9, 2022, 7 pages.
Office action received for European Patent Application No. 19729895.3, dated Aug. 19, 2022, 7 pages.
Non-Final Office Action received for U.S. Appl. No. 16/415,873, dated Oct. 4, 2022, 12 pages.
Intention to Grant received for European Patent Application No. 19729897.9, dated Oct. 24, 2022, 7 pages.

* cited by examiner

SYSTEM AND METHODS FOR THERMOFORMING ARTICLES

CROSS-REFERENCE TO RELATED APPLICATIONS

This application claims priority to U.S. Provisional application No. 62/662,628, filed on Apr. 25, 2018, and entitled System and Methods for Thermoforming Articles, the entire contents of which are incorporated by reference herein.

TECHNICAL FIELD

The present disclosure is directed to a system and methods for thermoforming articles and for preparing articles for thermoforming.

BACKGROUND

Thermoforming an article can include heating the article to, or above, a specific temperature and then cooling the article to, or below, a specific temperature. In certain processes, during this heating and cooling, the article may be formed into a particular shape or structure.

BRIEF DESCRIPTION OF THE SEVERAL VIEWS OF THE DRAWINGS

Illustrative aspects of the present invention are described in detail below with reference to the attached drawing figures, which are incorporated by reference herein and wherein.

DETAILED DESCRIPTION

Figure 1:
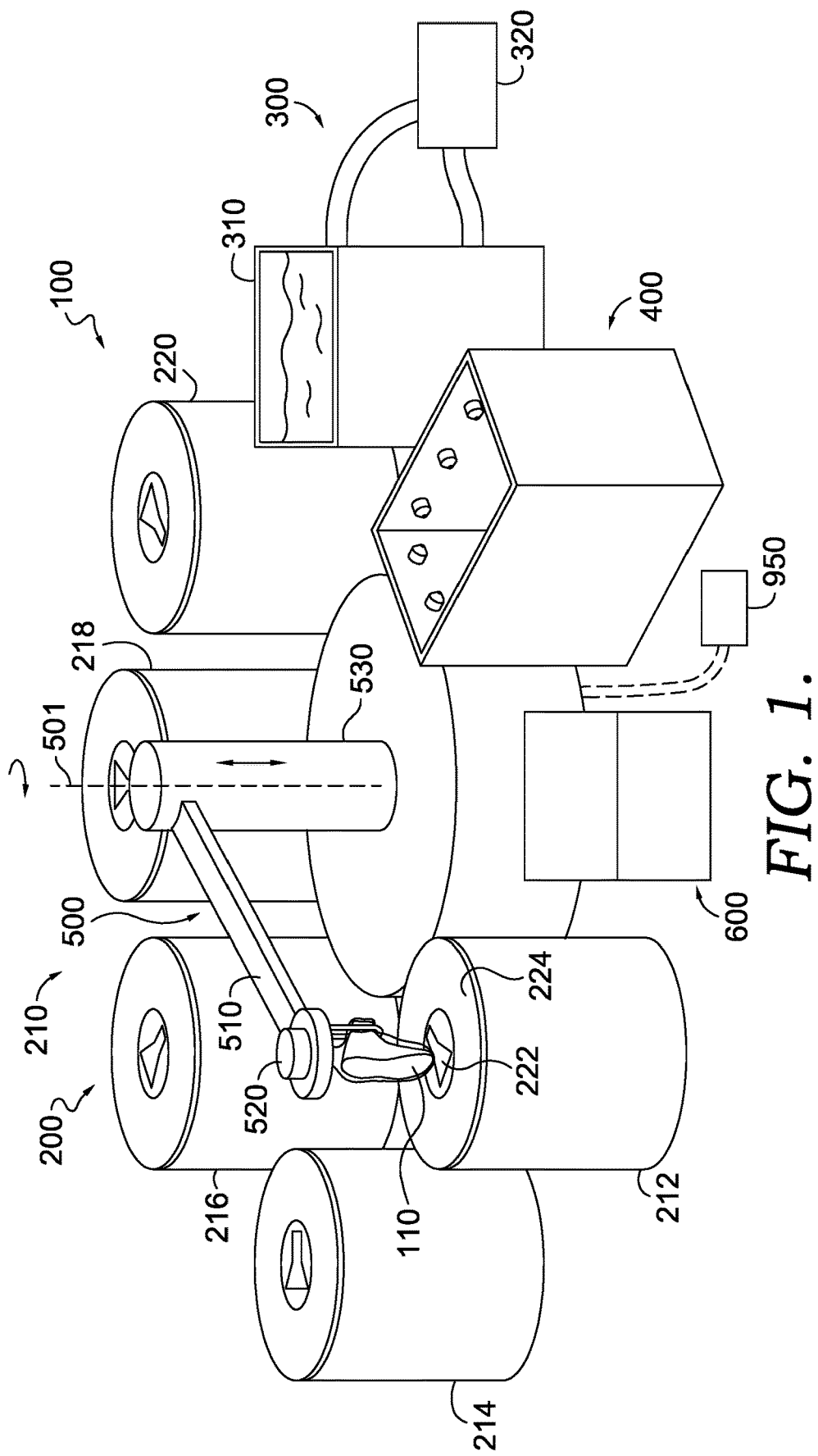
FIG. 1 depicts a top perspective view of a thermoforming system having a heating station including a plurality of heating chambers, a cooling station, a dryer, a loading/unloading station, and an article movement mechanism, in accordance with aspects hereof.

The subject matter of aspects of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects herein are directed to methods and systems for thermoforming articles and/or for preparing articles for thermoforming. Certain thermoforming systems can include heating an article and then cooling the article, while the article is formed into a desired shape. Certain current thermoforming systems may only provide inefficient or uneven exposure of the article to the various temperatures required in the heating and/or cooling processes of thermoforming. Further, certain current thermoforming processes can result in defects to the thermoformed article, e.g., by misalignment or creasing of a material utilized to aid in shaping or forming the thermoformed article, which may result in creases or other defects on the surface of the thermoformed article.

The systems and methods disclosed herein can alleviate one or more of the above-mentioned problems. For instance, a system is disclosed for preparing an article for thermoforming and the subsequent thermoforming of the article. At a high level, the system and methods disclosed herein can aid in inserting an article into a shaped compression material. In such aspects, vacuum or negative pressure can be applied to such a shaped compression material to apply a compressive force to all or a portion of the article during the thermoforming process. In certain aspects a compressive material or vacuum bag can be utilized that is shaped similar to the article and/or is substantially similar in size to the article, which can limit creases and other defects forming on the surface of the thermoformed article. However, the insertion of the lasted upper into the compression material can be manually difficult due to the minimal size and/or shape difference between the lasted upper and the compression material.

The system and methods described herein allow for efficient and aligned insertion of the article into a compression material, e.g., a shaped compression material. For example, in one aspect, the compression material can be placed in a vessel and negative pressure or vacuum pressure can be applied to expand the compression material to the dimensions of the vessel thereby allowing for ease of insertion of the article into the compression material. In aspects, an identifier on the vessel and/or the compression material can guide the article for proper aligned insertion into the compression material. In such an aspect, once the article is inserted into the expanded compression material, ambient atmospheric pressure (or a pressure above the negative pressure applied previously) can be applied to cause the compression material to shift from the expanded configuration to a more neutral configuration, with the article inserted therein. In aspects, vacuum pressure can then be applied so that the compression material can compress onto the article to allow for thermoforming.

Further, in certain aspects, systems and methods disclosed herein can provide for efficient and even exposure to the temperatures that may be required for each of the thermoforming process steps. For example, in aspects, the system and methods disclosed herein can introduce and rotate an article within a heating station so that each side of an article is exposed to the thermal elements present within a heating station, which can allow for more even heating of the article. Further, in aspects, the article can be exposed to vacuum pressure so that a compression material applies a compressive force to the article while being introduced and rotated within the heating station. Further, in certain aspects, the article can also be introduced and rotated within a cooling station, to allow for efficient cooling of the heated article. In such aspects, the cooling station may include a liquid, and the rotation of the heated article may facilitate more rapid conduction of the heat to the liquid from the upper to thereby cool down the upper more efficiently. In such aspects, the article can be exposed to vacuum pressure so that a compression material applies a compressive force to the article while being introduced and rotated within the cooling station. In various aspects, the vacuum pressure may be a continuous draw while the article is exposed to the heating and cooling stations, or can be a single initial draw prior to exposure to the heating and/or cooling stations, and the compression material can be sealed so as to maintain the compressive force on the article throughout the thermoforming process.

Accordingly, in one aspect a method for preparing an article for thermoforming is provided. The method can include inserting a compression material into a vessel, where the compression material can be present in a first position or configuration in the vessel. In this aspect, at least a portion of the compression material can form an interior portion adapted to receive an article. In aspects, the method can also include exposing an area between an outer surface of the compression material and an inner surface of the vessel to a pressure less than atmospheric pressure to shift the compression material from the first position to an expanded position, where, in the expanded position, at least a portion of the compression material is closer to the inner surface of the vessel than compared to the first position. In aspects, the method can also include inserting at least a portion of the article into the interior portion of the compression material while the compression material is in the expanded position. In aspects, the article can be present on a forming material. In various aspects, the method can also include exposing the area between the outer surface of the compression material and the inner surface of the vessel to a pressure at about atmospheric pressure so that the compression material shifts from the expanded position to a second position, where in the second position, at least a portion of the article is in the interior portion of the compression material and at least a portion of the compression material is closer to the article than when the article was inserted into the compression material in the expanded position.

In another aspect, a system for preparing an article for thermoforming is provided. The system can include a vessel. In aspects, the vessel can have an interior volume defined at least by a bottom portion and at least one sidewall extending up from the bottom portion to a top portion. In aspects, the vessel can include a port. In aspects, the system can also include a negative pressure generation system, which can be coupled to the port of the vessel. The system can further include, in aspects, a compression material, which can be positioned inside the interior volume of the vessel, where at least a portion of the compression material forms an interior portion adapted to receive an article. In aspects, the negative pressure generation system and the port are cooperatively adapted to expose an area between an outer surface of the compression material and an inner surface of the at least one sidewall to a pressure less than atmospheric pressure so that the compression material expands.

In yet another aspect, a method for thermoforming an article is provided. The method can include receiving a compression material having an article positioned inside the compression material. In aspects, the method can also include exposing an area between an inner surface of the compression material and an outer surface of the article to a pressure less than atmospheric pressure so that the compression material applies a compressive force onto the outer surface of the article. In aspects, the method can also include introducing the article to one or more heating stations and rotating the article within the one or more heating stations. Further, in aspects, the method can include introducing the article to a cooling station and rotating the article within the cooling station.

In yet another aspect, a system for thermoforming an article is provided. The system can include one or more heating stations. In aspects, each of the one or more heating stations can include a heating chamber. In various aspects, the system can also include a cooling station that includes a cooling chamber. In certain aspects, the system can also include an article movement mechanism. In aspects, the article movement mechanism can include at least one coupling member adapted to couple an article to the article movement mechanism. In aspects, the article movement mechanism can be adapted to rotate the article inside the heating chamber, the cooling chamber, or both.

Turning now to the figures, FIG. 1 depicts a system 100 for thermoforming articles. It should be understood, that while the system 100 depicts a portion of an article of footwear, e.g., an upper 110, being exposed to the system 100, other types of articles or other portions of an article of footwear can be utilized in the system 100 described herein. In the aspect depicted in FIG. 1, the system 100 includes a heating station 200, a cooling station 300, a dryer 400, a loading/unloading station 600, and an article movement mechanism 500.

As can be seen in FIG. 1, the article movement mechanism 500 is coupled to the upper 110 for delivery to the various stations and areas of the system 100. In the aspect depicted in FIG. 1, the article movement mechanism 500 is coupled to one article, the upper 110, via a coupling member 520 at one end of a radially extending member 510. The coupling of an article to the article movement mechanism 500 is discussed further below.

It should be understood that the article movement mechanism 500 can be coupled to any number of articles. For example, in one aspect, the article movement mechanism 500 can include more than one radially extending member, with each member coupled to an article. In such an aspect, the system 100 can expose a plurality of articles to a portion of the thermoforming system simultaneously, e.g., with each article being exposed to one station or chamber at a time. Further, in such an aspect, each article can be exposed to each station or chamber for substantially the same amount of time.

As can be seen in the aspect of FIG. 1, the system 100 is configured such that each station or chamber is circumferentially positioned with the article movement mechanism 500 at the center. In such an aspect, this circumferential design can provide a reduced footprint in a processing area as well as increased productivity, as article movement and/or additional operator contact with an article are reduced. Although not depicted in the figures, the system 100 may include an enclosure for housing the entire system 100 or a portion thereof. For instance, in one aspect, the system 100 can include an enclosure that encloses the heating station 200, the cooling station 300, the dryer 400, and the loading/unloading station 600.

In the aspect depicted in FIG. 1, the heating station 200 includes a plurality of heating chambers 210. In such an aspect, the plurality of heating chambers 210 can include five heating chambers 212, 214, 216, 218, and 220. In various aspects, by having individual heating chambers, the upper 110 or another article, may be exposed to different heating temperatures or environments in each individual heating chamber. For instance, in one aspect, the upper 110 may be exposed to a ramping up of temperature throughout the heating station 200 such that the upper 110 is exposed to increasing temperatures at each heating chamber, which may provide for more effective melting of the thermoformable or thermoplastic materials or portion of the upper 110. It should be understood that while the heating station 200 depicted in FIG. 1 includes five heating chambers, any number of heating chambers can be utilized and are contemplated for use in the invention described herein.

In aspects, in order to expose the upper 110 or other article to the heating station 200, e.g., by introducing the upper 110 into the heating chamber 212, the article movement mechanism 500 can rotate about an axis, e.g., an axis 501, and then lower the upper 110 through an opening 214 in the top portion 216 of a first heating chamber 212 of the heating station 200. In such an aspect, the article movement mechanism 500 can include any mechanism for moving the upper 110, and/or the radially extending member 510 up away from the heating chamber 212 and down towards the heating chamber 212. Further, in aspects, as discussed further below, the article movement mechanism 500 is adapted to rotate the upper 110 or other article, while the upper 110 is within the heating chamber 212, or any of the other heater chambers 214, 216, 218, or 220.

Figure 2:
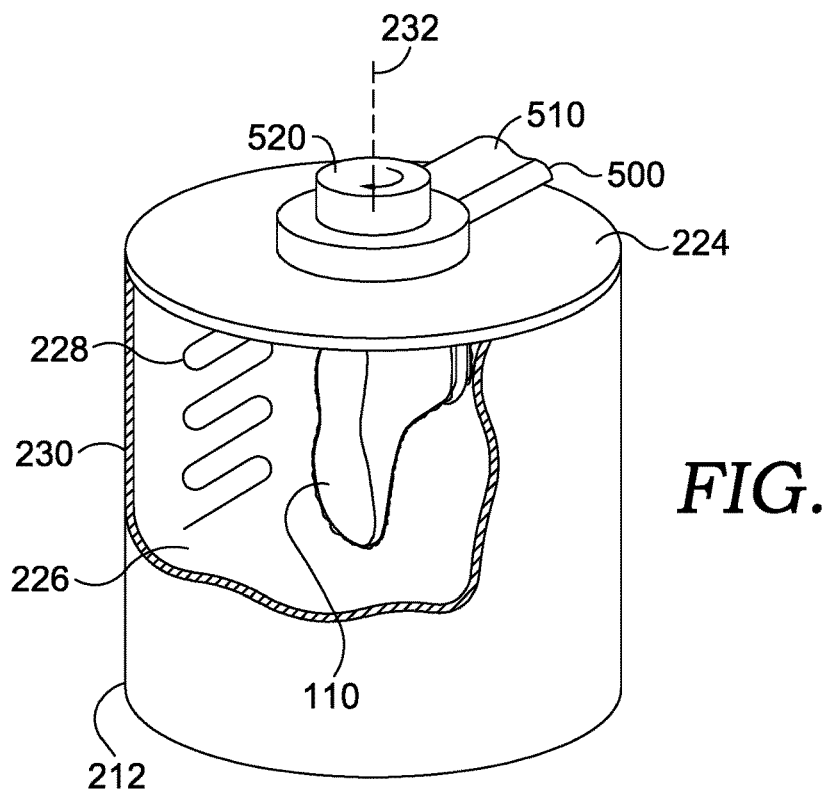
FIG. 2 depicts a top perspective view of a heating chamber with a portion removed to reveal an article of footwear positioned within the heating chamber and coupled to the article movement mechanism, in accordance with aspects hereof.

One specific example of a heating chamber, heating chamber 212, is depicted in FIG. 2. As can be seen in FIG. 2, the upper 110 is positioned in an interior portion 226 of the heating chamber 212, e.g., by the vertical shifting of the radially extending member 510 down towards the heating chamber 212. In the aspect depicted in FIG. 2, when the upper 110 or other article is positioned within the heating chamber 212, the coupling member 520 can at least partly or fully cover the opening 222 of the top portion 224, which may aid in retaining the thermal energy in the interior portion 226. In alternative aspects, the coupling member 520 may not cover the opening 222 of the top portion 224.

In the aspect depicted in FIG. 2, the heating chamber 212 can include one or more thermal elements 228. In this aspect, the thermal element 228 is positioned on a sidewall 230 of the heating chamber 212. It should be understood that other positions for thermal elements within the heating chamber 212 are also contemplated for use in the system 100 described herein. It should also be understood that more than one thermal element can be utilized in the heating chamber 212 and that one thermal element 228 is depicted as just one example. Further, the thermal element 228 in FIG. 2 is depicted schematically and such depiction is not intended to be limiting on the type and/or shape of thermal elements that can be utilized in the system 100 disclosed herein. For example, in one aspect, the thermal element 228 can be an Infrared (IR) lamp. In the same or alternative aspects, the thermal element 228 can include a heated fluid, such as air. In an aspect not depicted in the figures, the thermal element 228 can include an IR lamp or other thermal source adjacent a fan for distribution of the thermal energy emitted from the IR lamp or other thermal source.

In certain aspects, the heating station 200 and/or the heating chamber 212 is adapted to expose an article, such as the upper 110, to a temperature sufficient to cause at least a portion of a material of the article to melt and/or deform. For example, in one aspect, the heating station 200 and/or the heating chamber 212 is adapted to expose an article, such as the upper 110, to a temperature above the melting temperature of a thermoplastic material of the upper 110 or other article. In the same or alternative aspects, the heating station 200 and/or the heating chamber 212 is adapted to expose an article, such as the upper 110, to a temperature in the range of about 100° C. to about 350° C., about 150° C. to about 340° C., or about 200° C. to about 330° C.

As discussed above, in certain aspects, the system 100 can provide for rotation of the upper 110 while positioned within the heating chamber 212. For example, as depicted in FIG. 2, at least a portion of the article movement mechanism 500 can rotate about an axis 232 so that the upper 110 can be more evenly heated in the heating chamber 212. For instance, in one aspect, the coupling member 520 can rotate about the axis 232 relative to the radially extending member 510 to facilitate the rotation of the upper 110 in the interior portion 226 of the heating chamber 212, which can provide direct exposure of each side of the article 110 to the thermal element 228. The article movement mechanism 500 is discussed in more detail below.

It should be understood that while the heating chamber 212 is discussed in detail above, the description of any or all of the features of the heating chamber 212 are applicable to the other heating chambers, e.g., one or more of the heating chambers 214, 216, 218, and 220.

As discussed above, the heating station 200 can include a plurality of heating chambers 210. In such an aspect, the plurality of heating chambers 210 can be utilized to ramp up the temperature that the upper 110 is exposed to in a sequential manner. For instance, in one aspect, the upper 110 is exposed to an increased temperature at each subsequent heating chamber. In such aspects, the upper 110 can be exposed to a temperature that is at least about 2° C. higher, at least about 5° C. higher, or at least about 7° C. higher at an immediate subsequent heating chamber compared to the prior heating chamber. For example, in one aspect, the upper 110 can be exposed to a temperature at the heating chamber 214 that is about 2° C. higher or about 5° C. higher than a temperature that the upper 110 was exposed to in the heating chamber 212.

Figure 3:
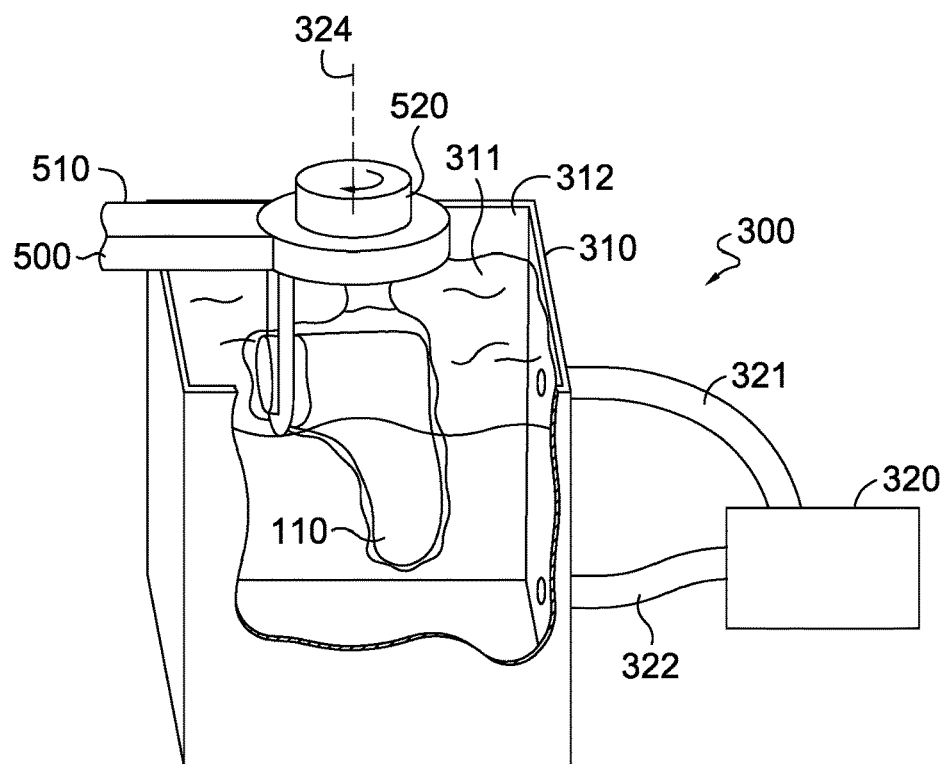
FIG. 3 depicts a top perspective view of a cooling station with a portion removed to reveal an article of footwear positioned within the cooling chamber, and where the cooling chamber is coupled to a secondary cooling source, in accordance with aspects hereof.

In certain aspects, after the upper 110 is exposed to the heating station 200, e.g., to one or more heating chambers of the plurality of heating chambers 210, the upper 110 is exposed to a cooling station, e.g., a cooling station 300. FIG. 3 depicts one example of a cooling station 300. As can be seen in the aspect depicted in FIG. 3, the cooling station 300 includes a cooling chamber 310 and a secondary cooling source 320. In certain aspects, the article movement mechanism 500, e.g., by rotation of the radially extending member 510, can transfer the upper 110 from the heating station 200 to the cooling station 300.

In certain aspects, the cooling station 300 can expose the upper 110 to a cooled fluid, e.g., a cooled liquid. For example, as can be seen in FIG. 3, the cooling station 310 can include a liquid 311 in an interior portion 312 of the cooling chamber 310. In such aspects, the liquid 311 can be cooled to facilitate a rapid decrease in temperature of the heated upper 110. In certain aspects, the liquid 311 can be maintained at a specific temperature by circulation of the liquid 311 between the cooling chamber 310 and the secondary cooling source 320, which can in aspects, cool the liquid 311. The secondary cooling source 320 can cool the liquid 311 using conventional liquid cooling techniques. In certain aspects, such as that depicted in FIG. 3, liquid 311 from the cooling chamber 310, which may in aspects have been warmed up due to contact with the heated upper 110, can travel to the secondary cooling source 320 via the conduit 321. Further, in such aspects, the cooled liquid 311 can travel back to the cooling chamber 310 via the conduit 322. It should be understood that other configurations for maintaining the fluid 311 at a specific temperature can be utilized and are contemplated for use in the system described herein.

In aspects, the cooling station 300 can expose the upper 110 to a temperature in the range of about 0° C. to about 30° C., about 2° C. to about 25° C., about 3° to about 20° C., or a temperature of about 4° C., or about 5° C. In certain aspects, the fluid 311 can comprise water or one or more other aqueous solvents. In the same or alternative aspects, the fluid 311 can comprise glycol or one or more other coolant liquids.

In certain aspects, the circulation of the liquid 311 can provide agitation or circulation within the cooling chamber 310 so that heat from the heated upper 110 is effectively transferred from the upper 110 to the liquid 311. In the same or alternative aspects, the upper 110 can rotate about an axis 324 to provide agitation of the liquid 311, e.g., the coupling member 520 can rotate about the axis 324 relative to the radially extending member 510 to facilitate the rotation of the upper 110 in the interior portion 312 of the cooling chamber 310. The article movement mechanism 500 is discussed in more detail below.

In certain aspects, not depicted in the figures, the upper 110 can be exposed to more than one cooling chamber 310. For instance, in one aspect, the system 100 can include an additional cooling chamber so that the upper is first exposed to the cooling chamber 310 and then subsequently exposed to a second cooling chamber. In such an aspect, the second cooling chamber can include any or all of the features of the cooling chamber 310 discussed above.

As discussed further below, the upper 110 can be positioned inside of a compression material. In such an aspect, the compression material can be water- or liquid-impermeable so that when the upper 110 is submerged in the liquid 311 the upper 110 does not absorb or otherwise attract the liquid 311 thereto, or come into contact with the liquid 311. Further, in such an aspect, after the upper 110 is removed from the cooling chamber 310, the compression material may harbor liquid 311 on its outer surface, which may be removed by the dryer 400.

Figure 4:
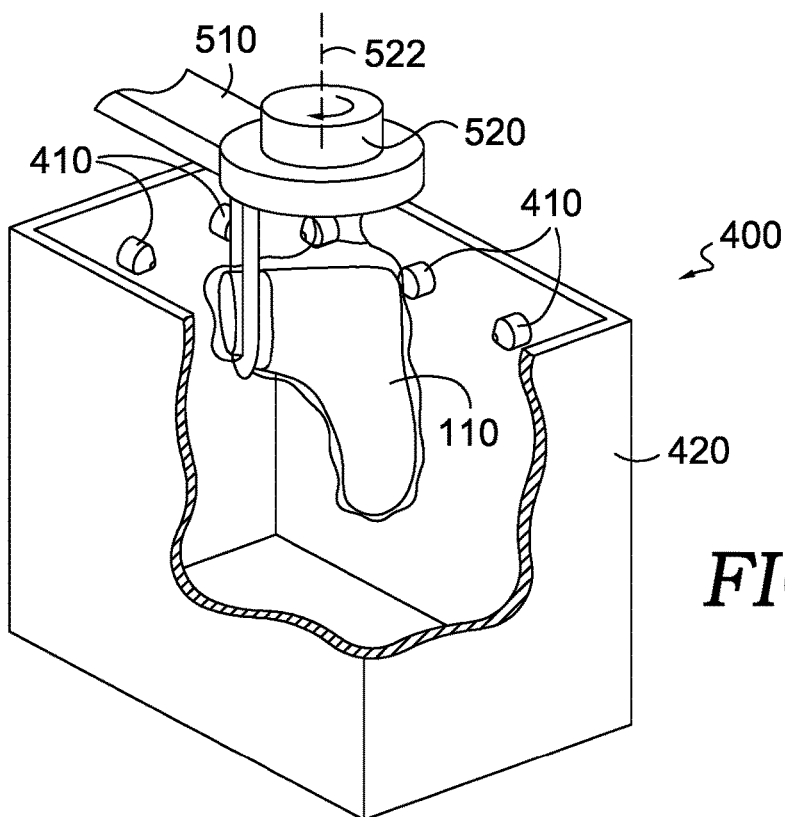
FIG. 4 depicts a top perspective view of a dryer with a portion removed to reveal an article of footwear positioned within the dryer, in accordance with aspects hereof.

FIG. 4 depicts one example of a dryer 400. In certain aspects, the upper 110 can optionally be transferred to the dryer 400 after exposure to the cooling station 300, e.g., via the by rotation of the radially extending member 510 from adjacent the cooling station 300 to the dryer 400. It should be understood that the dryer 400 depicted in FIG. 4 is just one example dryer 400 and that other drying mechanisms are contemplated for use in the present system 100. The dryer 400 depicted in FIG. 4 includes one or more air nozzles 410 for providing a stream of air to the upper 110 in order to remove at least a portion of the liquid 311 that may be present thereon, or on the compression material. In one aspect, the stream of air can be room temperature, e.g., air that is approximately 25° C.

In certain aspects, the upper 110 can vertically shift, e.g., via the vertical shifting of the radially extending member 510, while the air nozzles 410 provide a stream of air over all or a portion of the upper 110. In certain aspects, the dryer 400 can optionally include a reservoir 420 for collecting the fluid 311 removed from the upper 110 or the compression material positioned on the upper 110.

In one aspect, the upper 110 may rotate about the vertical axis 522, via the rotation of the coupling member 520, as discussed herein. In alternative aspects, the upper 110 may not be rotated about the vertical axis 522 while the upper 110 is exposed to the stream of air from the air nozzles 410.

In certain aspects, once the upper 110 is exposed to the dryer 400 or the cooling station 300, the upper 110 may be transferred to the loading/unloading station 600 for removal from the system 100 and/or for further processing. In such an aspect, the upper 110 can be transferred to the loading/unloading station 600 via rotation of the radially extending member 510.

As discussed above, in aspects, the system 100 can expose the upper 110 or other article to a heating station 200, a cooling station 300, and a dryer 400. In certain aspects, in operation, the upper 110 is loaded into the system 100, e.g., at the loading/unloading station 600, by coupling the upper 110 to the article movement mechanism 500. The coupling of an article to the article movement mechanism 500 is discussed in more detail below. Further in aspects, once the upper 110 is coupled to the article movement mechanism 500, the article movement mechanism 500 can rotate about an axis, e.g., an axis 501, and then lower the upper 110 through an opening 214 in the top portion 216 of a first heating chamber 212 of the heating station 200. In such an aspect, the article movement mechanism 500 can include any mechanism for moving the upper 110, and/or the radially extending member 510 up away from the heating chamber 212 and down towards the heating chamber 212. Further, in aspects, the article 110, via the article movement mechanism 500, may be exposed to the heating chamber 214, then exposed to the heating chamber 216, then to the heating chamber 218, and then to the heating chamber 220 (or to any number of heating chambers suitable for a particular system configuration or process). Further, in certain aspects, the upper 110 is then transferred to the cooling station 300 for cooling the heated upper 110. Optionally, the upper 110 is then transferred to the dryer 400 for removing at least a portion of the liquid 311 present thereon, or on the compression material. Further, in such aspects, the upper 110 may be transferred back to the loading/unloading station 600 for removal from the system 100.

As discussed above, in certain aspects, the article movement mechanism 500 can be utilized to transfer the upper 110 from one station to the next station. Further, as discussed above, the article movement mechanism 500 can include a plurality of radially extending members with each member coupled to an upper. In such an aspect, the article movement mechanism 500 can transfer each upper attached to each of a plurality of radially extending members to a subsequent processing station substantially at the same time. Stated differently, in one aspect the plurality of radially extending members can be fixedly coupled to a central portion 530 that rotates, thereby causing each of the plurality of radially extending members and the articles coupled thereto to rotate. In such an aspect, each article or upper is exposed to each station for a substantially similar amount of processing time. For example, the upper 110 may be exposed to a single cooling station 300 for about 30 seconds, while the upper 110 is exposed to each of the five heating chambers for 30 seconds each, so that the upper 110 is exposed to the heating station 200 for about 150 seconds. In aspects, where there may be six heating chambers, the upper 110 may be exposed to the heating station for about 180 seconds, while being exposed to the cooling station for 30 seconds (or 60 seconds in the aspect where there are two cooling chambers). It should be understood that the 30 second per station or per step time mentioned above is only one example for timing of exposure to the various stations or steps discussed above. In alternative aspects, the upper 110 or other article can be exposed to each station or step from about 10 seconds, about 20 seconds, about 28 seconds, about 45 seconds, or about 60 seconds.

As discussed above, one example article for use with the system 100 disclosed herein can be an upper 110 for an article of footwear. FIGS. 5A-5D depict the various components of the upper 110 and the assembly of the upper 110 components on a last 700. It should be understood that, in certain aspects, the upper 110 and the components of the upper 110 mentioned below may be assembled in other manners not depicted in the figures. For instance, in one aspect, the components of the upper 110 may be assembled off the last 700 and, once assembled, may then be applied to the last 700.

Figure 5A:
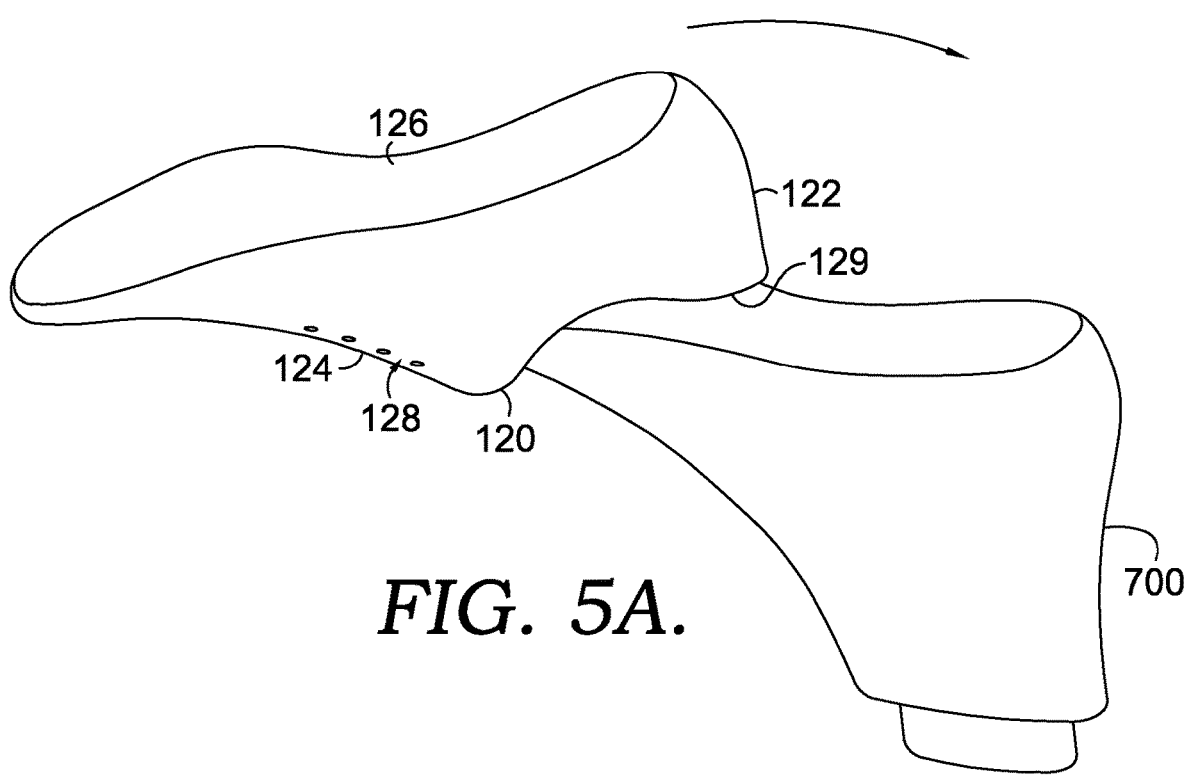
FIG. 5A depicts a top perspective view of a liner being placed on a last, in accordance with aspects hereof.

FIG. 5A depicts a liner 120 being placed on the last 700. In certain aspects, the last 700 can be formed of a rigid material that is capable of withstanding the temperatures and other processing parameters discussed herein with respect to the system 100. In various aspects, the liner 120 can include a heel portion 122, a forefoot portion 124, and a ground-facing portion 126.

In certain aspects, the liner 120 can be formed from any type of material. In certain aspects, the liner 120 can include a knit textile, a braided textile, a woven textile, and a non-woven textile, a film, a sheet, or a molded article, such as an injection molded article, a foamed material, or a combination thereof. In the same or alternative aspects, the liner 120 can include natural materials, synthetic materials, or a combination of natural and synthetic materials. In one aspect, the liner 120 can include a non-woven textile. In various aspects, the liner 120 may include multiple pieces of one or more materials that are secured together, e.g., by bonding or stitching. In one or more aspects, the liner 120 can optionally include a plurality of eyestays 128. In aspects, the liner 120 is positioned on the last 700 by inserting the last 700 into a void 129 of the liner 120.

Figure 5B:
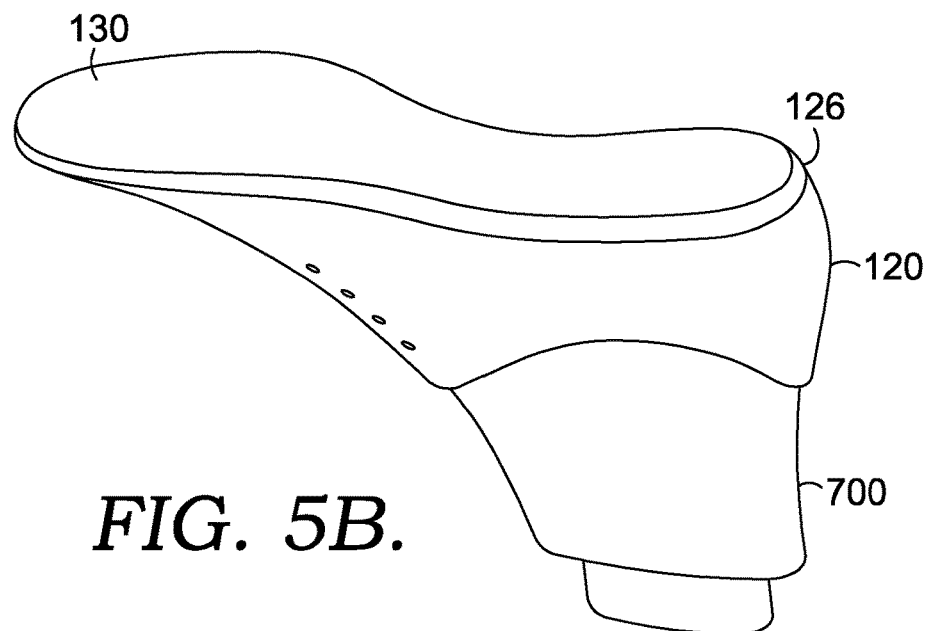
FIG. 5B depicts a top perspective view of a chassis positioned on a sole portion of the liner that is positioned on a last, in accordance with aspects hereof.

FIG. 5B depicts a chassis 130 that is positioned on the ground-facing portion 126 of the liner 120 positioned on the last 700. In one aspect, the chassis 130 can be formed of any type of material as long as such a material can provide support and stability to the upper 110 and the article of footwear formed therefrom. In one aspect, the chassis 130 can include a material that may fuse with other portions of the upper throughout the thermoforming process. In such an aspect, the chassis can include a thermoplastic material that has a melting temperature, a Vicat softening temperature, a heat deflection temperature, or any combination thereof, in the range of about 80° C. to about 135° C., or from about 90° C. to about 120° C. The melting temperature can be determined according to the test method detailed in ASTM D7138-16. The Vicat softening temperature can be determined according to the test method detailed in ASTM D1525-09, preferably using Load A and Rate A. The heat deflection temperature can be determined according to the test method detailed in ASTM D648-16, using a 0.455 MPa applied stress. In aspects, all or a portion of the chassis 130 can be made from such a material or the chassis 130 can be coated with such a material for fusing to another portion or portions of the upper 110, such as the liner 120 and/or the bootie 150 discussed further below. In one aspect, an adhesive, such as a hot melt adhesive, may be utilized to secure at least a portion of the chassis 130 to the liner 120.

Figure 5C:
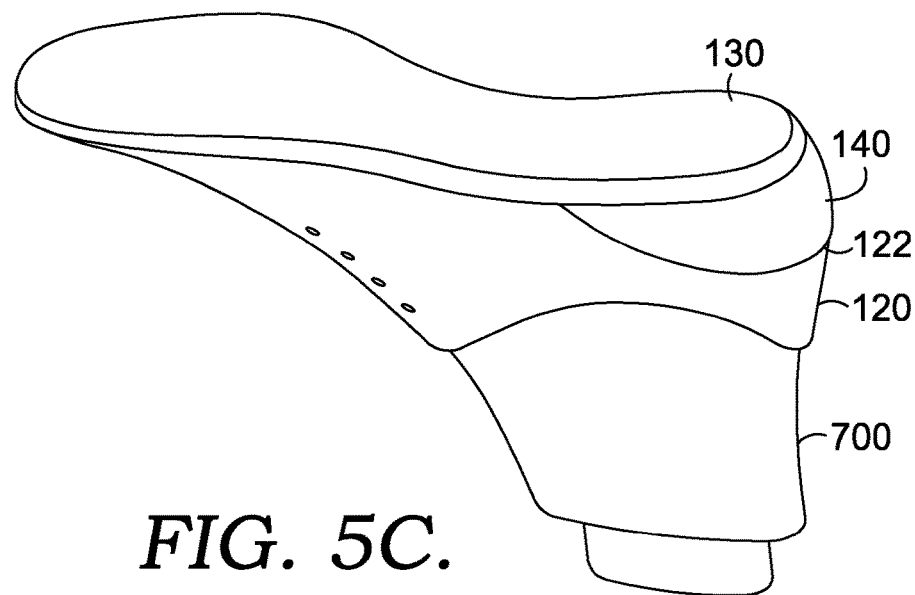
FIG. 5C depicts a top perspective view of a heel counter positioned on a heel portion of the liner of FIG. 5B, in accordance with aspects hereof.

FIG. 5C depicts a heel counter 140 placed on the heel portion 122 of the liner 120. In certain aspects, the heel counter 140 can provide stability to the heel region of the upper. In certain aspects, an adhesive, such as a hot melt adhesive, can be utilized to secure at least a portion of the heel counter 120 to the liner 120. In aspects, the heel counter 140 can be formed from any material as long as such a material can provide heel support upon exposure to the system 100 and processes described herein.

In aspects, the heel counter 140 can include one or more of the fusable materials discussed above with reference to the chassis 130. In such an aspect, upon exposure to the system 100 and/or processes described herein, at least a portion of the heel counter 140 may melt or deform and fuse or bond to another component of the upper 110, such as the liner 120 and/or the bootie 150.

Figure 5D:
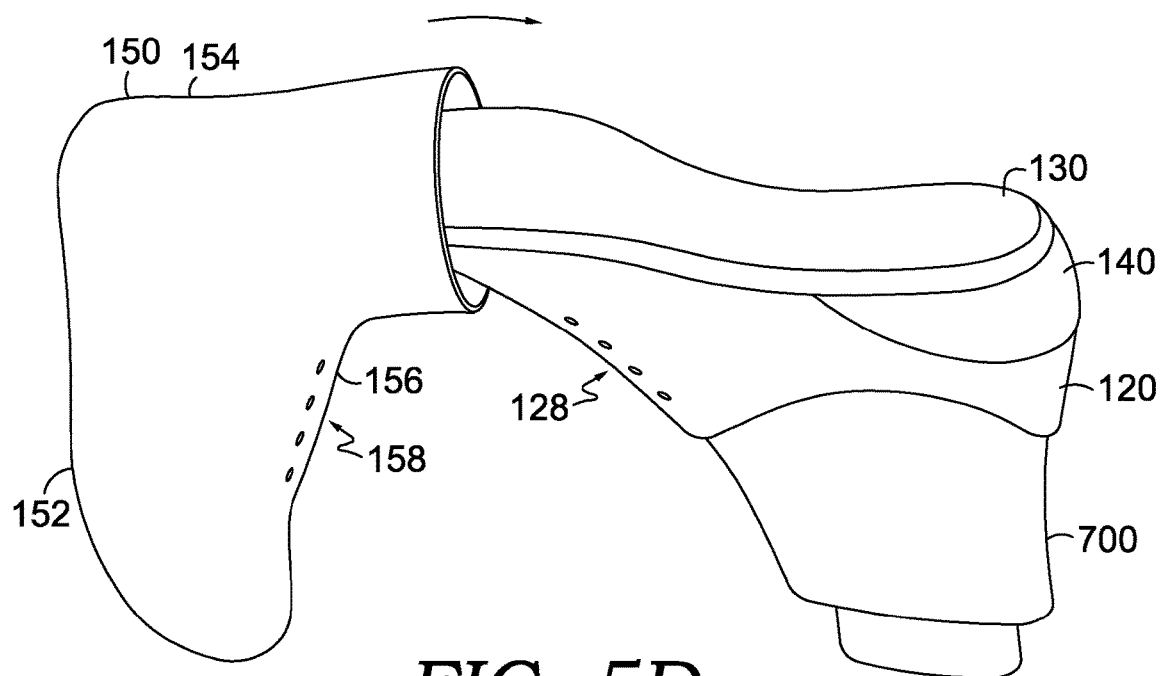
FIG. 5D depicts a top perspective view of a bootie being positioned over the liner, chassis, and heel counter from FIG. 5C, in accordance with aspects hereof.

FIG. 5D depicts the bootie 150 being placed on the liner 120, chassis 130, and the heel counter 140 positioned on the last 700. The bootie 150 of FIG. 5D includes a ground-facing portion 152, a heel portion 154, a forefoot portion 156, and a plurality of eyestays 158. In certain aspects, the bootie 150 may not include the eyestays 158. In one aspect, the bootie 150 may be sock-like in that it can, by itself, substantially cover a forefoot region, a heel region, a ground-facing region of a wearer's foot.

In aspects, the bootie 150 can include a woven, braided, knit, or non-woven textile. In aspects, such a textile may include one or more yarns or fibers comprising a yarn or fiber composition that includes a thermoplastic material. In such aspects, the thermoplastic material and/or the yarn or fiber composition can exhibit a melting temperature (or melting point), Vicat softening temperature, heat deflection temperature, or a combination thereof, that is from about 80° C. to about 135° C., or from about 90° C. to about 120° C. In one aspect, the thermoplastic material and/or the yarn or fiber composition can exhibit a melting temperature, Vicat softening temperature, heat deflection temperature, or a combination thereof, that is about 135° C. or less, about 125° C. or less, or about 120° C. or less. In the same or alternative aspects, the bootie 150 can include one or more materials that will not melt or deform under the processing conditions disclosed herein. In such an aspect, in the case of such a thermoplastic material, such material can exhibit a melting temperature greater than about 135° C., greater than about 140° C., or greater than about 150° C. Further, in such aspects, another material that may be present in the article, such as a material other than a thermoplastic material, may not degrade below a temperature of about 150° C., about 140° C., or about 135° C.

In aspects, the eyestays 158 on the bootie 150 can align with the eyestays 128 present on the liner 120. In various aspects, an alignment mechanism can be utilized to achieve alignment of the eyestays 158 with the eyestays 128.

Figure 5E:
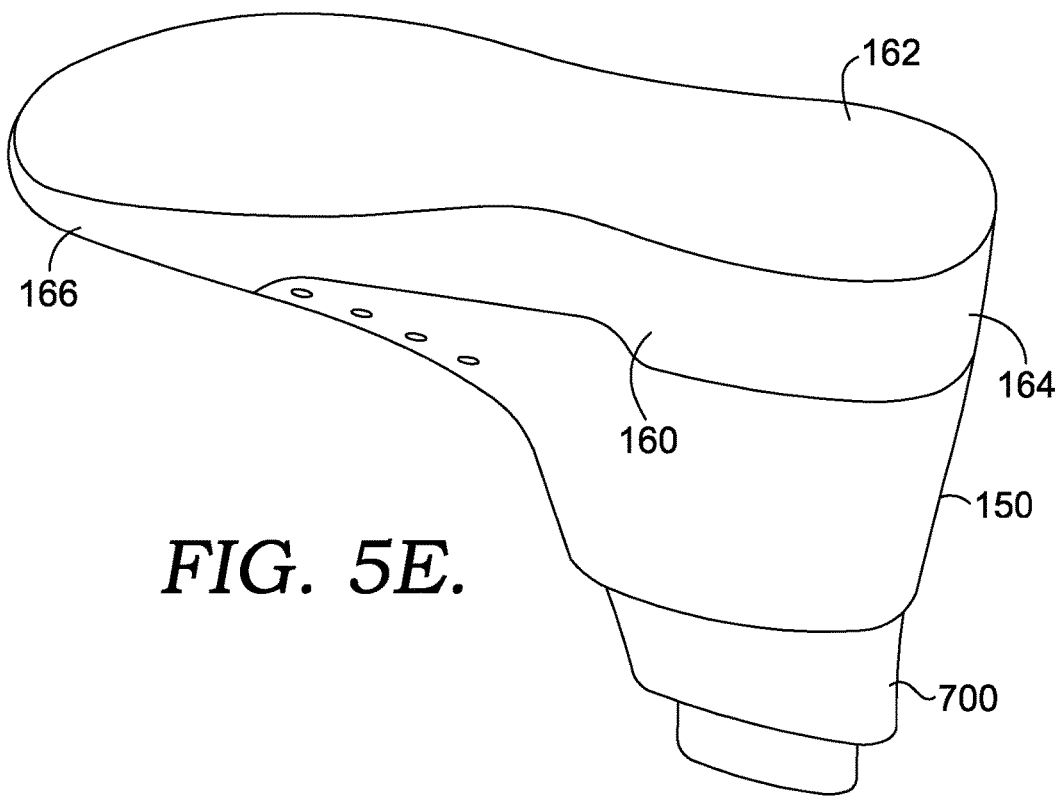
FIG. 5E depicts a top perspective view of a film being position on the bootie from FIG. 5D, in accordance with aspects hereof.

Turning now to FIG. 5E a film 160 is depicted that has been placed on the outside of the bootie 150 present on the last 700. In certain aspects, the film 160 can include a ground-facing portion 162, a heel portion 164, and a toe-covering portion 166. In certain aspects, through exposure to the system 100 and the thermoforming processes disclosed herein, the film 160 can include a thermoplastic material that can melt and cool to form a film on the upper 110 to provide support, stability, and/or a moisture barrier, for example. In certain aspects, the thermoplastic material can exhibit the melting temperature, heat deflection temperature, Vicat sofetening temperature, or a combination thereof, in the range of 80° C. to about 135° C., or from about 90° C. to about 120° C., or about 135° C. or less, about 125° C. or less, or about 120° C. or less. It should be understood that the film 160 depicted in FIG. 5E is one example and other films of films having varying coverage of varying portions of the upper 110 can be utilized depending upon the desired properties.

Figure 6:
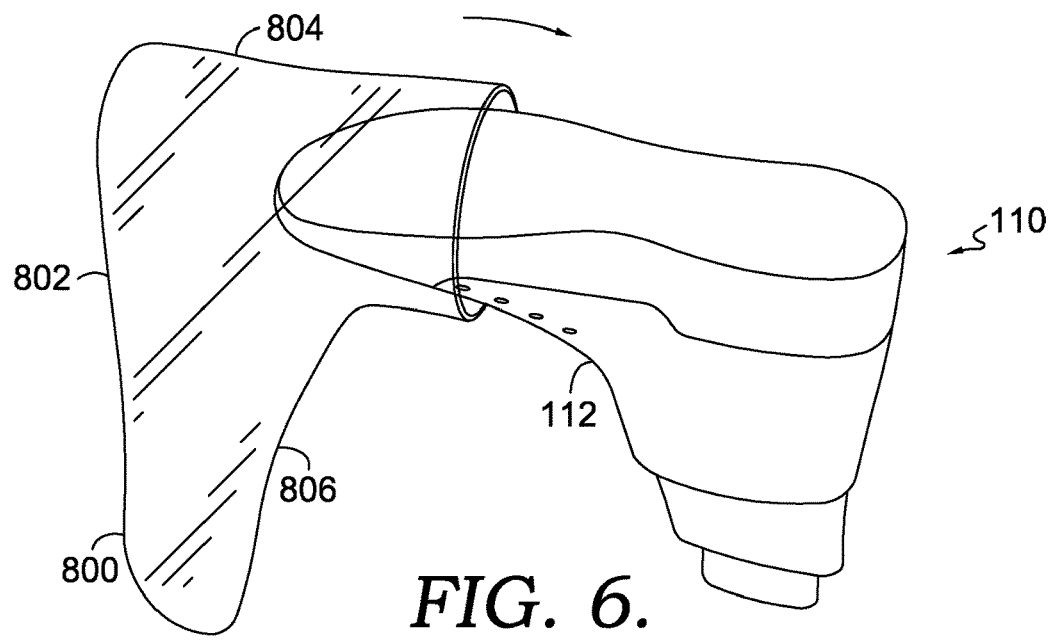
FIG. 6 depicts a top perspective view of a compression bootie being positioned on the upper assembly from FIG. 5E, in accordance with aspects hereof.

FIG. 6 depicts the assembled upper 110 discussed above with reference to FIGS. 5A-5E positioned on the last 700. As discussed above, the upper 110 can include materials that may melt and flow upon exposure to the system 100 and thermoforming processes disclosed herein. Further as discussed above, in certain aspects, one or more of the upper 110 components may include a material that is to fuse or bond to another material or component of the upper 110 upon exposure to the system 100 and thermoforming processes disclosed herein. In one or more of these aspects, it may be desirable to provide a compressive force to the upper 110 to facilitate the fusing or bonding, to restrict the flow of the melted thermoplastic material, and/or to aid in forming the upper 110 or portion thereof to the forming material, e.g., the last 700. In such aspects, a compression bootie can be utilized to provide such a compressive force to an outer surface 112 of the upper 110.

FIG. 6 depicts one example compression bootie 800 that is being applied onto the upper 110 positioned on the last 700. As can be seen in FIG. 6, the compression bootie 800 can be sock-like in that includes a ground-facing portion 802, a heel portion 804, and a forefoot potion 806. In one or more aspects, the compression bootie 800 can be formed or comprise an elastomeric material in order to provide a compressive force on the outer surface 112 of the upper 110. In certain aspects, the compression bootie 800 can be formed from any elastomeric material as long as the elastomeric material exhibits a melting temperature or degradation temperature that is at least 10° C. greater, or at least 20° C. or greater, than the processing temperatures described above with reference to the heating station 200. In one aspect, the compression bootie 800 can include polysiloxane.

Figure 7B:
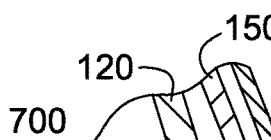
FIG. 7B depicts a close up view of the cutaway portion of FIG. 7A, particularly showing the layers of the compression bootie, the film, the bootie, the heel counter, and the liner, in accordance with aspects hereof.
Figure 7A:
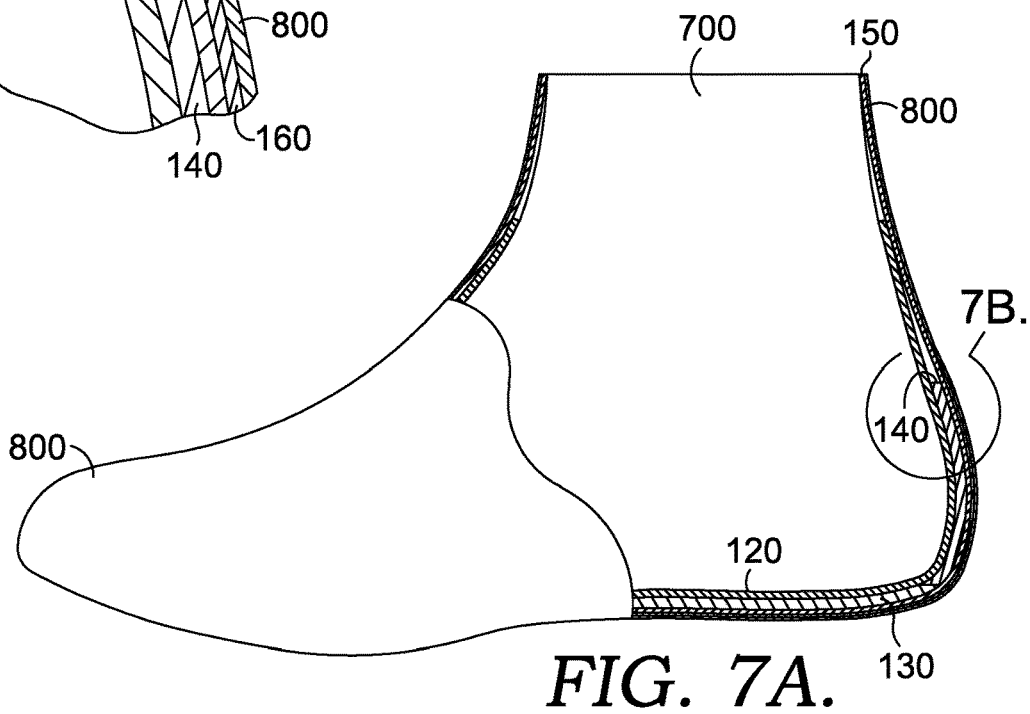
FIG. 7A depicts a side and partial cutaway view of the compression bootie and the upper assembly from FIG. 6, in accordance with aspects hereof.

FIG. 7A depicts the lasted upper 110 with the compression bootie 800 positioned over the lasted upper 110. The partial cross-section in FIG. 7A shows the arrangement of the various components of the upper 110 discussed above with reference to FIGS. 5A-5E. As can be seen in FIG. 7A, the liner 120 is in contact with the last 700, with the chassis 130 and heel counter contacting the liner 120 and the bootie 150, and the film 160 is positioned between the bootie 150 and the compression bootie 800. FIG. 7B provides a close up view of the heel region of the lasted upper 110 of FIG. 7A.

As discussed above, in certain aspects, the compression bootie 800 can apply a compressive force onto the upper 110 pressing the upper 110 against the rigid last 700. In such an aspect, this compressive force can aid in restricting the flow of the film 160 upon melting so that it cools and hardens in the desired position on the upper 110. Further, in aspects, this compressive force may facilitate the bonding of one or more of the upper 110 components, e.g., the heel counter 140 fusing or bonding to the bootie 150 and/or the liner 120.

In certain aspects, an additional increased level of compressive force on the upper 110 may be desired, in addition the compressive force applied by the compression bootie 800. In such aspects, the lasted upper 110 covered with the compression bootie 800 may have a compression material compressed onto the outer surface of the compression bootie 800 to apply this additional level of compressive force to the lasted upper 110. In certain aspects, the compression material can be a vacuum bag. The compression material can be formed of any material as long as such a material will not melt or deform throughout exposure to the system 100 and processes disclosed herein. In one aspect, the compression material may be utilized directly on the upper 110 in the absence of the compression bootie 800.

In one or more aspects, the vacuum bag or compression material can be at least partly shaped similar to the forming material and/or article that is to be thermoformed. For example, FIG. 8A depicts a compression material 910 that includes a portion 912 that is at least partly or substantially shaped like a last 700 and/or the upper 110, at least in that the portion 912 generally includes a bootie shape having a ground-facing portion 914, a heel potion 918, and a forefoot portion 916.

In certain aspects, it may be desirable that the portion 912 of the compression material 910 is similar or slightly larger in size to that of the lasted upper 110 inserted therein. However, in such an aspect it may be difficult to efficiently insert a lasted upper 110 into a similarly-sized compression material 910. In such an aspect, a system or mechanism may be utilized to facilitate the assembling of the compression material 910 on the lasted upper 110.

Figure 8A:
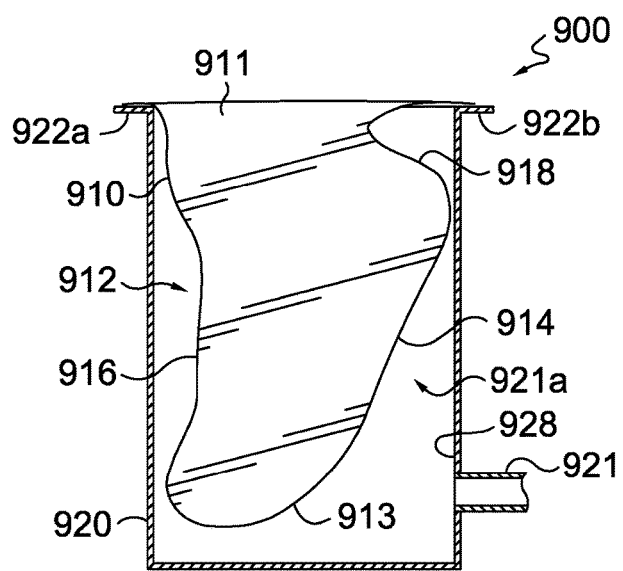
FIG. 8A depicts a side view of a compression assembly system, particularly showing a negative pressure vessel partially cutaway to reveal a compression material positioned within the negative pressure vessel, in accordance with aspects hereof.

FIGS. 8A-8D depict a compression assembly system 900 that can be utilized to facilitate inserting a lasted upper 910 into a similarly sized and/or similarly shaped compression material 910. As can be seen in FIG. 8A, the compression assembly system 900 can include the compression material 910 and a negative pressure vessel 920. It should be understood that the compression assembly system 900 is just one example system to facilitate assembling a compression material 910 onto a lasted upper 110, or other article, and that other system components or designs are also contemplated by the present disclosure.

As can be seen in FIG. 8A, the compression material 910 has been inserted into the interior portion 926 of the negative pressure vessel 920. As discussed above, since the compression material 910 may be similarly sized or similarly shaped to the lasted upper 110, the neutral configuration or position of the compression material 910 in FIG. 8A may make it difficult to efficiently insert the lasted upper 110 into an interior portion 911 of the compression material 910. In such an aspect, the compression material 910 can be shifted to an expanded configuration to expand the interior portion 911 to allow for more efficient insertion of the lasted upper 110. For example, as seen in FIGS. 8A-8D, the negative pressure vessel 920 can include a port 921, which can provide negative pressure, or vacuum pressure, to the volume 921a between the outer surface 913 of the compression material 910 and the inner surface 928 of the negative pressure vessel 920. In such an aspect, at least a portion of the compression material 910 can couple to, or otherwise provide or form a seal, at a top portion 922a and 922b of the negative pressure vessel 920 to allow for the drawing of the vacuum pressure in the volume 921a. In certain aspects not depicted in the figures, the port 921 can be coupled to a negative pressure generation device to provide the vacuum pressure to the volume 921a.

Figure 8B:
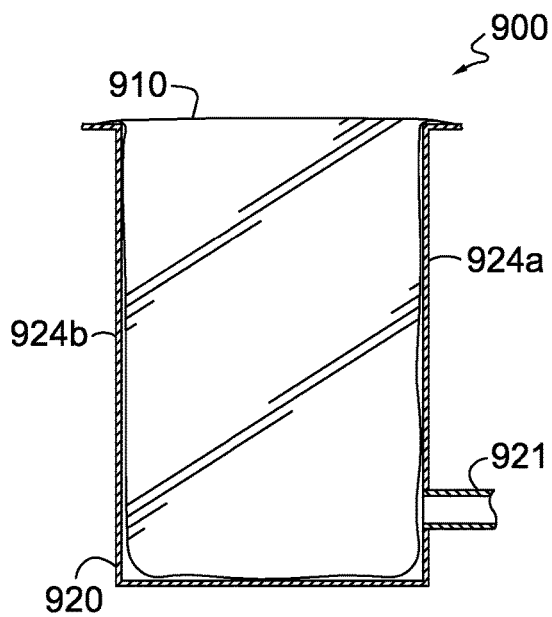
FIG. 8B depicts a side view of the compression assembly system of FIG. 8A, where the compression material is in an expanded configuration or position and has expanded to the dimensions of the negative pressure vessel, in accordance with aspects hereof.

As can be seen in FIG. 8B, upon exposing the volume 921a between the outer surface 913 of the compression material 910 and the inner surface 928 of the negative pressure vessel 920 to negative or vacuum pressure, the compression material 910 can shift into an expanded configuration, such that at least a portion of the compression material 910 is closer to the sidewalls 924a and 924b of the negative pressure vessel 920 than in the neutral configuration of the compression material depicted in FIG. 8A. In one aspect, upon exposing the volume 921a between the outer surface 913 of the compression material 910 and the inner surface 928 of the negative pressure vessel 920 to negative or vacuum pressure, the compression material 910 can form to the dimensions of the negative pressure vessel 920.

Figure 8C:
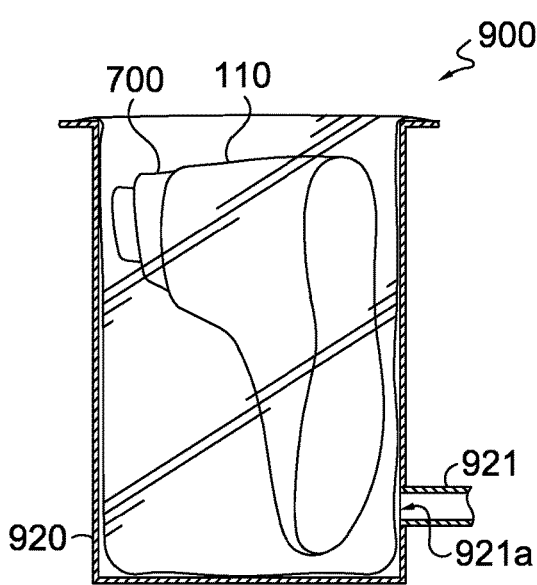
FIG. 8C depicts a side view of the compression assembly system of FIG. 8B, with a lasted upper inserted inside the compression material while the compression material is in the expanded configuration or position, in accordance with aspects hereof.

In certain aspects, in this expanded configuration of the compression material 910, such as that depicted in FIGS. 8B and 8C, an upper 110 positioned on a last 700 can be more easily inserted into the interior portion 911 of the compression material 910. In an aspect not depicted in the figures, an identifier on the compression material 910, the negative pressure vessel; 920, or both, may be provided to identify the orientation at which the upper 110 should be placed in the compression material for the proper fit. In aspects, the port 921 can provide a continuous draw of vacuum pressure or exposure of vacuum pressure to the volume 921a while the lasted upper 110 is being inserted into the interior portion 911. In alternative aspects, the port 921 can provide an initial, non-continuous, draw of vacuum pressure or exposure of vacuum pressure to the volume 921a and is then sealed to maintain the compression material in the expanded configuration while the lasted upper 110 is being inserted into the interior portion 911.

Figure 8D:
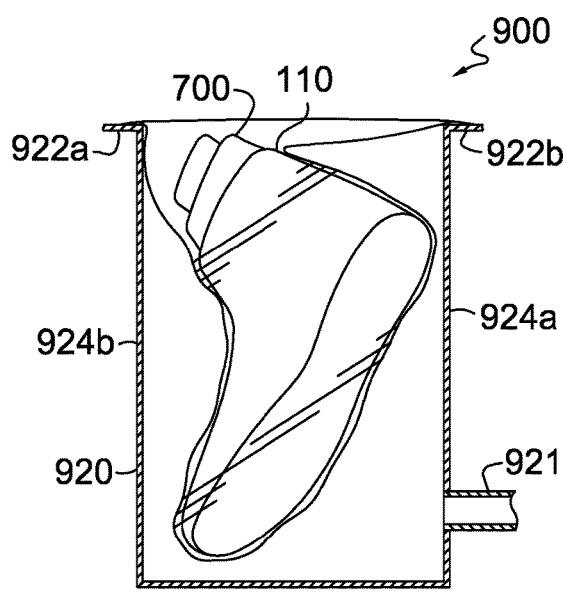
FIG. 8D depicts a side view of the compression assembly system of FIG. 8C, with the lasted upper inserted inside the compression material and the compression material shifted away from the expanded configuration and is positioned adjacent the article, in accordance with aspects hereof.

In certain aspects, once the lasted upper 110 is inserted into the interior portion 911 of the compression material 910, the port 921 may cease to provide the negative or vacuum pressure to the volume 921a, or a seal is removed, so that the compression material 910 may shift from the expanded configuration depicted in FIGS. 8B and 8C to a closed configuration or position depicted in FIG. 8D. In one aspect, the port 921 may supply a pressure at or about atmospheric pressure to the volume 921a, which can cause the compression material 910 to shift away from the sidewalls 924a and 924b and towards the lasted upper 110. Further, in such an aspect, the compression material 910 can be de-coupled from the top portions 922a and 922b and removed for further processing, such as compressing the compression material 910 onto the lasted upper 110 and exposing the lasted upper 110 to the system 100 and/or the thermoforming processes described herein.

Figure 9:
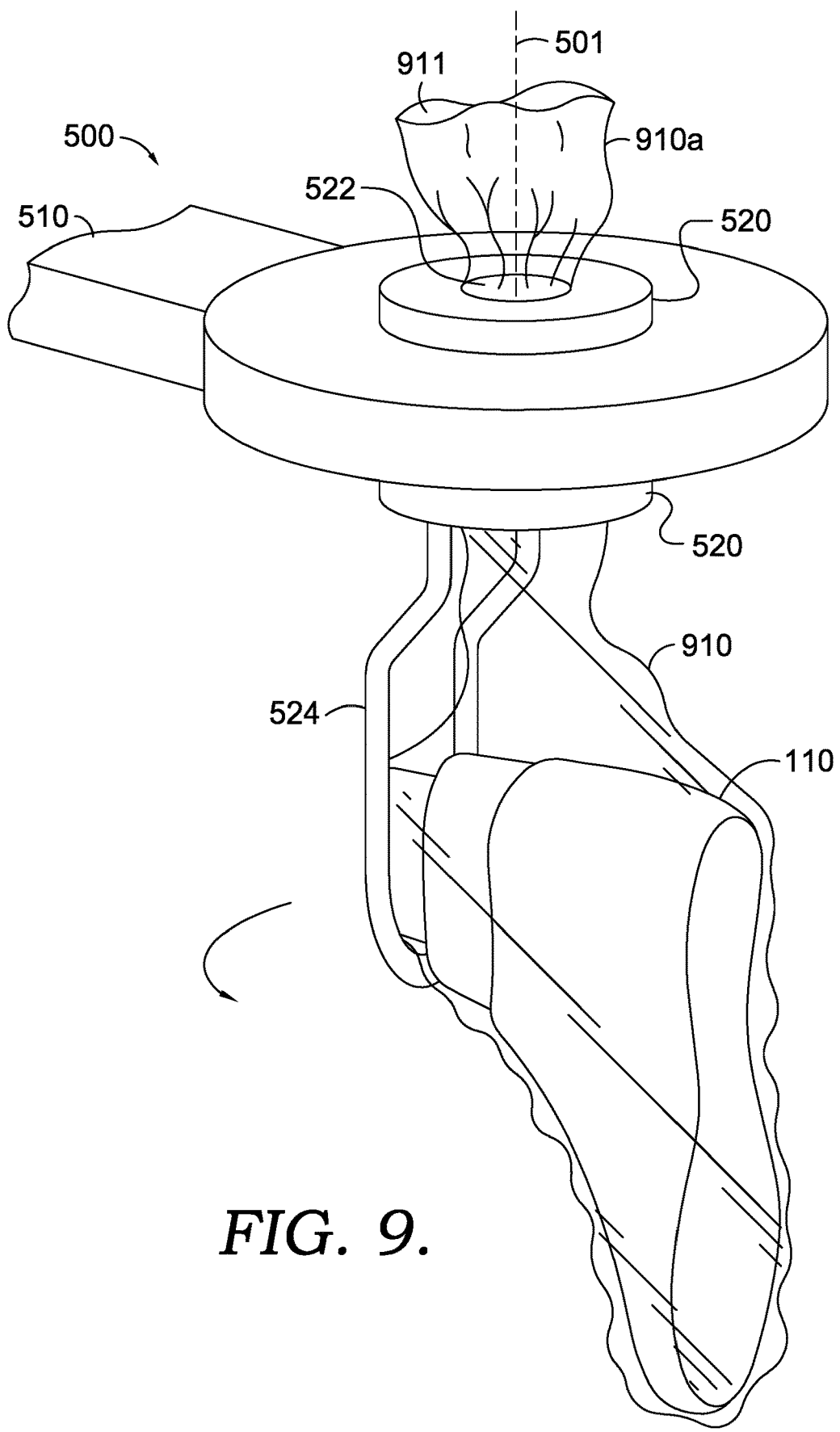
FIG. 9 depicts a top perspective view of a portion of the article movement mechanism, particularly showing a lasted upper positioned inside of a compression material, where the compression material is coupled to a coupling member of the article movement mechanism, in accordance with aspects hereof.

In certain aspects, once the lasted upper 110 is inserted into the compression material 910, the lasted upper 110 can be coupled to the article movement mechanism 500. A close up view of one example article movement mechanism 500 that includes the radially extending member 510 and coupling member 520 are depicted in FIG. 9. FIG. 9 also depicts one example of how the lasted upper 110 can be coupled to the article movement mechanism 500.

In certain aspects, a portion 910a of the compression material 910 that extends beyond the lasted upper 110 can be coupled to the article movement mechanism 500. As can be seen in the aspect depicted in FIG. 9, the portion 910a of the compression material 910 can extend through the coupling member 520 with a top portion 522 utilized to seal off the interior portion 911 of the compression material 910. In an aspect not depicted in the figures, a port within the coupling member 520 of the article movement mechanism 500 can provide vacuum or negative pressure to the interior portion 911 of the compression material 910 in order to cause the compression material 910 to apply a compressive force onto the lasted upper 110. In such an aspect, a negative pressure generation device 950, depicted in FIG. 1, can be coupled to the article movement mechanism 500. The negative pressure generation device 950 can be any type of vacuum pressure device and can be coupled to the article movement mechanism 500 using any couple mechanism, with a particular device or coupling mechanism chosen for a particular design or purpose.

In one aspect, the interior portion 911 of the compression material 910 can be exposed to vacuum or negative pressure in a continuous manner as the upper 110 is transferred between stations or chambers of the system 100 described above. In such an aspect, the article movement mechanism 500 can provide this continuous negative pressure via the negative pressure generation system 950.

In alternative aspects, the interior portion 911 of the compression material 910 can be exposed to vacuum or negative pressure at an initial single step, in order to compress the compression material 910 onto the lasted upper 110 and then the coupling member 520 can seal off the interior portion 911 of the compression material 910, e.g., via the top portion 522 or other member, in order to maintain the vacuum pressure within the interior portion 911. In such an aspect, the article movement mechanism 500 can provide this initial single exposure of negative pressure via the negative pressure generation system 950. In one aspect, another negative pressure source, other than the negative pressure generation system 950, can be utilized to provide the vacuum pressure to the interior portion 911, and the compression material 910 can be sealed either by the coupling member 520 or through another sealing mechanism.

As discussed above, in certain aspects, the upper 110 can rotate when positioned within the heating station 200, e.g., within the heating chamber 212, and/or when positioned within the cooling citation 300, e.g., within the cooling chamber 310. Further, as discussed above, in such an aspect, the article movement mechanism 500 can rotate the upper 110. As can be seen in FIG. 9, the coupling member 520 can rotate, relative to the radially extending member 510, about the vertical axis 501. In one aspect, in order to have a continuous draw of the vacuum pressure in the interior 911 of the compression material 910, the vacuum can be drawn through an axis of rotation, e.g., the axis 501, from which the compression material 910 and the lasted upper 110 rotate.

Further, as can be seen in FIG. 9, the coupling member 520 can include a downward-extending hook 524 that is coupled to at least another portion of the coupling member 520. In such an aspect, as the coupling member 520 rotates, the hook 524 can also rotate. In such an aspect, a portion of the lasted upper 110 can interface with or removably couple to the hook 524 to allow for the rotation of the upper 110 as the coupling member 520 and hook 524 rotate. In certain aspects, the hook 524 can also provide for the efficient loading and unloading of the lasted upper 110, in combination with ease of removal of the compression material 910 from the coupling member 520, e.g., by release of the top portion 522 of the coupling member 520.

In certain aspects, as discussed above, the compression material 910 may be similarly sized and/or similarly shaped to the last 700 and/or the upper 110. After exposure to the thermoforming process, in certain aspects, it may be desirable to utilize assistance in order to facilitate the removal of the compression material 910 from the upper 110. In such an aspect, an air stream may be blown into the interior 911 of the compression material 910 to aid in the release of the compression material 910 from the surface of the upper 110, or to enlarge the interior 911 to make removal of the upper 110 easier. In one aspect, a port associated with the article movement mechanism 500 can provide such an air stream. In alternative aspects, the air stream may be supplied by another air nozzle or port not associated with the article movement mechanism 500 or other components of the system 100 discussed above.

Figure 10:
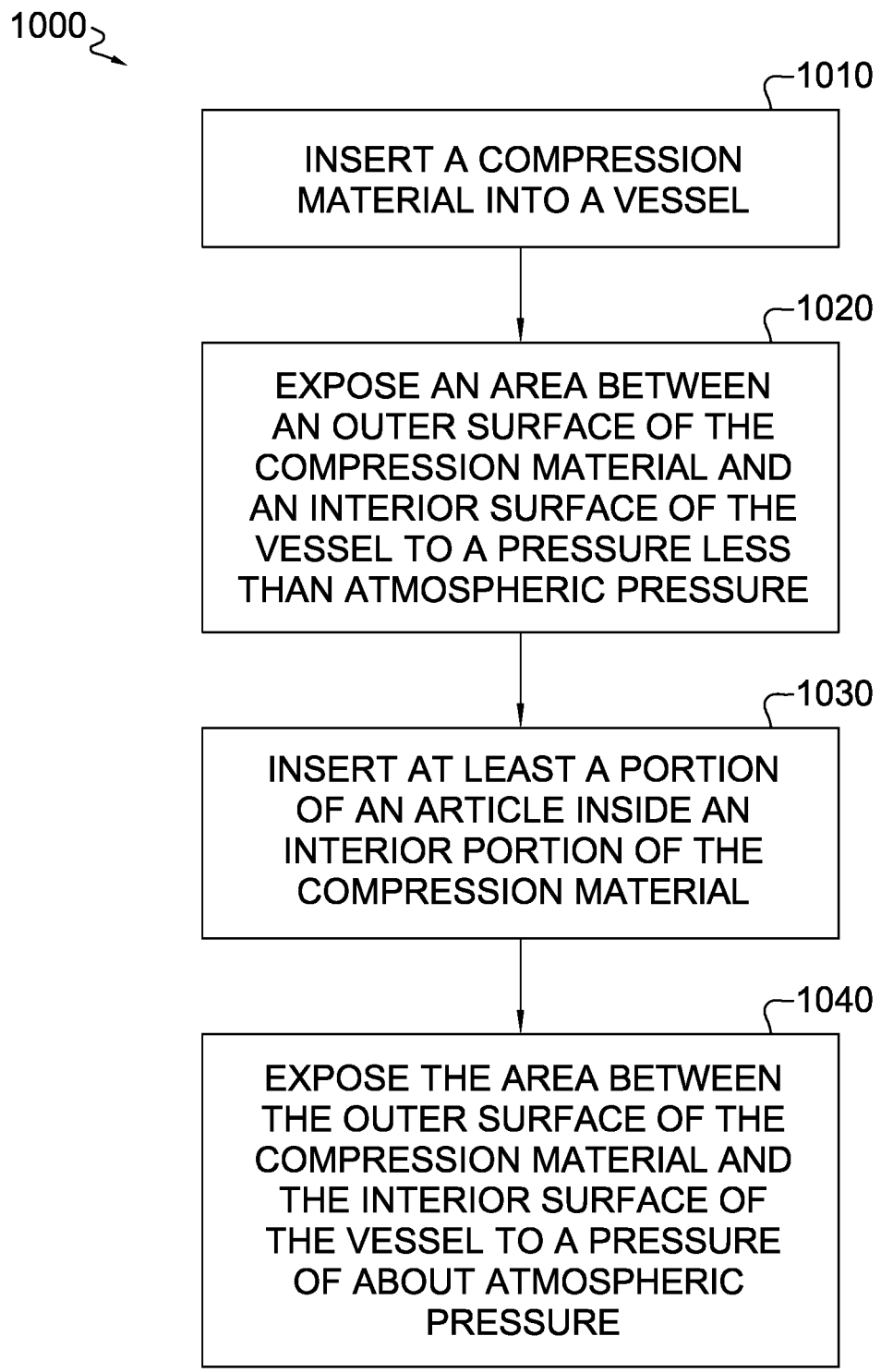
FIG. 10 depicts a flow diagram of a method for preparing an article for thermoforming, in accordance with aspects hereof.

FIG. 10 depicts a flow diagram of a method 1000 for preparing an article for thermoforming. The method 1000 can include the step 1010 of inserting a compression material into a vessel. In aspects, the compression material can include any or all of the features, properties, and parameters of the compression material 910 discussed above with reference to FIGS. 8A-9. In certain aspects, the vessel can include any or all of the features, properties, and parameters of the negative pressure vessel 920 discussed above with reference to FIGS. 8A-8D. In aspects, the compression material is present in a first position in the vessel. In one aspect, the first position can be similar to the position or configuration of the compression material 910 depicted in FIG. 8A. In aspects, the compression material can include an interior portion adapted to receive an article.

The method 1000 can include a step 1020 of exposing an area between an outer surface of the compression material and an inner surface of the vessel to a pressure less than atmospheric pressure. In such an aspect, this pressure, less than atmospheric pressure, can shift the compression material from the first position to an expanded position. In such an aspect, in the expanded position, at least a portion of the compression material can be closer to the inner surface of the vessel than that compared to the first position. In one or more aspects, in the expanded position, the compression material can exhibit at least a portion of the dimensions of the vessel, such as that depicted in FIG. 8B.

The method 1000 can also include the step 1030 inserting at least a portion of an article inside an interior portion of the compression material. As discussed above, in certain aspects, the article can include an upper positioned on a last. In such aspects, the upper can include any or all of the features, properties, and parameters of the upper 110 discuss above with reference to FIGS. 5A-7B. In aspects, the entire upper, or a portion of the upper, can be positioned inside the compression material.

The method 1000 can include the step 1040 of exposing the area between the outer surface of the compression material and the inner surface of the vessel to a pressure at about atmospheric pressure so that the compression material shifts from the expanded position to a second position. In such an aspect, in the second position, at least a portion of the article is in the interior of the compression material and the compression material is closer to the article than when the article was inserted into the compression material in the expanded position. For instance, in one aspect, the second position of the compression material can be similar to that depicted in FIG. 8D, where the compression material has moved away from the sidewalls of the vessel and is positioned adjacent to the article.

Figure 11:
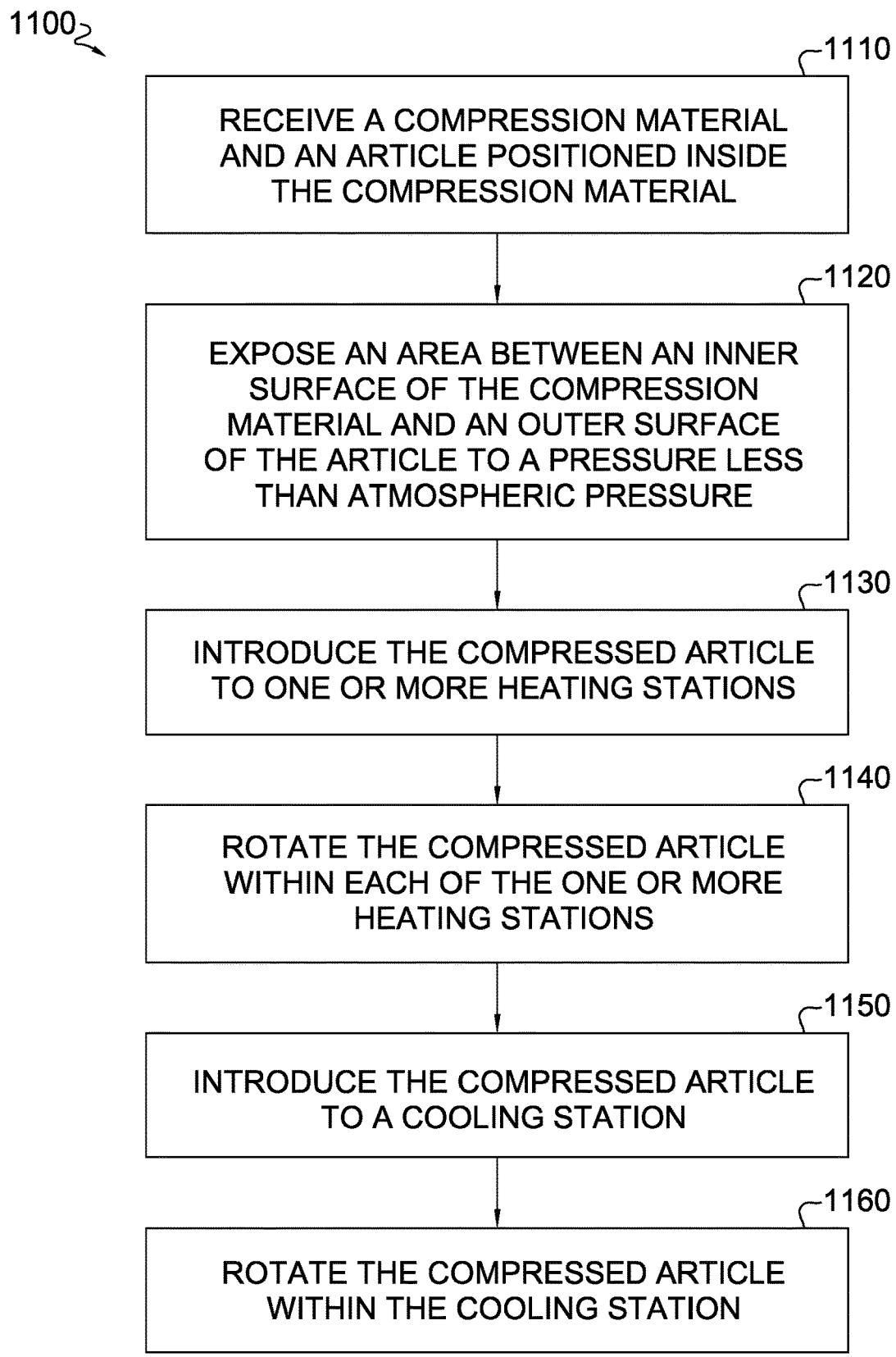
FIG. 11 depicts a flow diagram of a method for thermoforming an article, in accordance with aspects hereof.

FIG. 11 depicts a flow diagram of a method 1100 for thermoforming an article. The method 1100 can include the step 1110 of receiving a compression material having an article positioned inside the compression material. In aspects, the compression material can include any or all of the features, properties, and parameters of the compression material 910 discussed above with reference to FIGS. 8A-9. In certain aspects, the article can include a lasted upper, such as the lasted upper 110 discussed above with reference to FIGS. 5A-7B.

The method 1100 can include the step 1120 of exposing an area between an inner surface of the compression material and an outer surface of the article to a pressure less than atmospheric pressure. In such an aspect, the compression material can apply a compressive force onto the outer surface of the article. In certain aspects, the article movement mechanism 500 and the negative pressure generation system 950 can be utilized to provide the negative pressure and expose the area to a pressure less than atmospheric pressure.

The method 1100 can include the step 1130 of introducing the article to one or more heating stations. In aspects, the one or more heating stations can include any or all of the features, properties, and parameters of the heating station 200 discussed above with reference to FIGS. 1 and 2. The method 1100 can also include the step 1140 of rotating the article within each of the one or more heating stations. In such aspects, the article movement mechanism 500 discussed above with reference to FIGS. 1, 2, and 9 can be utilized to couple the article thereto and to rotate the article within each of the one or more heating stations.

The method 1100 can also include the step 1150 of introducing the article to a cooling station. In aspects, the cooling station can include any or all of the features, properties, and parameters of the cooling station 300 discussed above with reference to FIGS. 1 and 3. In one aspect, the article movement mechanism 500 discussed above with reference to FIGS. 1, 3, and 9 can be utilized to transfer the article from the one or more heating stations to the cooling station. The method 1100 can also include the step 1160 of rotating the article within the cooling station. In such an aspect, the article movement mechanism 500 discussed above with reference to FIGS. 1, 2, and 9 can be utilized to rotate the article within the cooling station.

While specific reference in FIGS. 10 and 11 is made to one or more steps, it is contemplated that one or more additional or alternative steps may be implemented while achieving aspects provided herein. As such, blocks may be added or omitted while still staying within the scope hereof.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A method for thermoforming an article, the method comprising:
   receiving a compression material having an article positioned inside the compression material, wherein the article is an upper for an article of footwear, wherein a compression bootie is positioned over the upper, and wherein the compression bootie comprises an elastomeric material;
   exposing an area between an inner surface of the compression material and an outer surface of the article to a pressure less than atmospheric pressure so that the compression material applies a compressive force onto the outer surface of the article;
   introducing the article to one or more heating stations;
   rotating the article within the one or more heating stations;
   introducing the article to a cooling station; and
   rotating the article within the cooling station.

2. The method according to claim 1, wherein the area between the inner surface of the compression material and the outer surface of the article is continuously exposed to the pressure less than atmospheric pressure during the introducing of the article to the one or more heating stations and during the rotating of the article within the one or more heating stations.

3. The method according to claim 1, wherein the exposing the area between the inner surface of the compression material and the outer surface of the article to the pressure less than atmospheric pressure further comprises sealing the article inside the compression material in order to maintain the compressive force on the outer surface of the article in the absence of a continuous exposure to the pressure less than atmospheric pressure.

4. The method according to claim 1, wherein the area between the inner surface of the compression material and the outer surface of the article is continuously exposed to the pressure less than atmospheric pressure during the introducing of the article to the cooling station and during the rotating of the article within the cooling station.

5. The method according to claim 1, wherein the one or more heating stations comprises at least two heating chambers, wherein each of the at least two heating chambers comprises one or more thermal elements.

6. The method according to claim 5, wherein the one or more thermal elements are positioned on a portion of at least one side wall of each of the at least two heating chambers so that the rotating of the article within the one or more heating stations exposes each side of the article to the one or more thermal elements.

7. The method according to claim 1, wherein the cooling station comprises a liquid housed in a cooling chamber, wherein the introducing of the article to the cooling station comprises submerging at least a portion of the article in the liquid.

8. The method according to claim 7, wherein the liquid exhibits a temperature of about 25° C. or less.

9. The method according to claim 7, wherein the rotating of the article within the cooling station comprises rotating the article while the at least a portion of the article is submerged in the liquid.

10. The method according to claim 7, further comprising circulating the liquid between the cooling chamber and a secondary cooling source so that the liquid is maintained at a temperature of about 25° C. or less.

11. The method according to claim 1, wherein the compression material has a melting temperature, a degradation temperature, or both, above 110° C.

12. The method according to claim 1, wherein the article comprises at least a portion of an article of footwear.

13. The method according to claim 12, wherein the at least a portion of an article of footwear comprises an upper.

14. The method according to claim 1, wherein the upper is positioned on a last.

15. The method according to claim 1, wherein the cooling station comprises a liquid housed in a cooling chamber, and wherein the introducing of the article to the cooling station comprises submerging at least a portion of the article in the liquid.

16. The method according to claim 1, wherein the upper is positioned on a last.

17. The method according to claim 1, wherein the compression material is similar in shape to the article.

18. The method according to claim 1, wherein the upper comprises a bootie, and wherein a chassis or heel counter is positioned inside the upper.

19. The method according to claim 1, wherein the upper comprises a bootie and a liner, wherein the bootie comprises eyestays and the liner comprises eyestays, and wherein the eyestays of the bootie are aligned with the eyestays of the liner.

20. The method according to claim 1, wherein the upper comprises a bootie and a film positioned over the bootie, and wherein the film comprises a thermoplastic material that exhibits a melting temperature, heat deflection temperature, Vicat softening temperature, or a combination thereof, in the range of about 80° C. to about 135° C.

* * * * *

UNITED STATES PATENT AND TRADEMARK OFFICE
CERTIFICATE OF CORRECTION

PATENT NO. : 11,590,686 B2
APPLICATION NO. : 16/393748
DATED : February 28, 2023
INVENTOR(S) : Mirko Bianconi and Federico Zecchetto It is certified that error appears in the above-identified patent and that said Letters Patent is hereby corrected as shown below:

On the Title Page

• Under (57) ABSTRACT, delete "20 Claims", and insert -- 18 Claims --.

In the Claims

• Column 18, Claims 12 and 13 should be deleted.

Signed and Sealed this
Twentieth Day of June, 2023

Katherine Kelly Vidal
*Director of the United States Patent and Trademark Office*